July 7, 1953     H. A. SAMMIS     2,644,715
PIVOTED SIDE BARS FOR MILL WAGONS
Filed Dec. 28, 1949
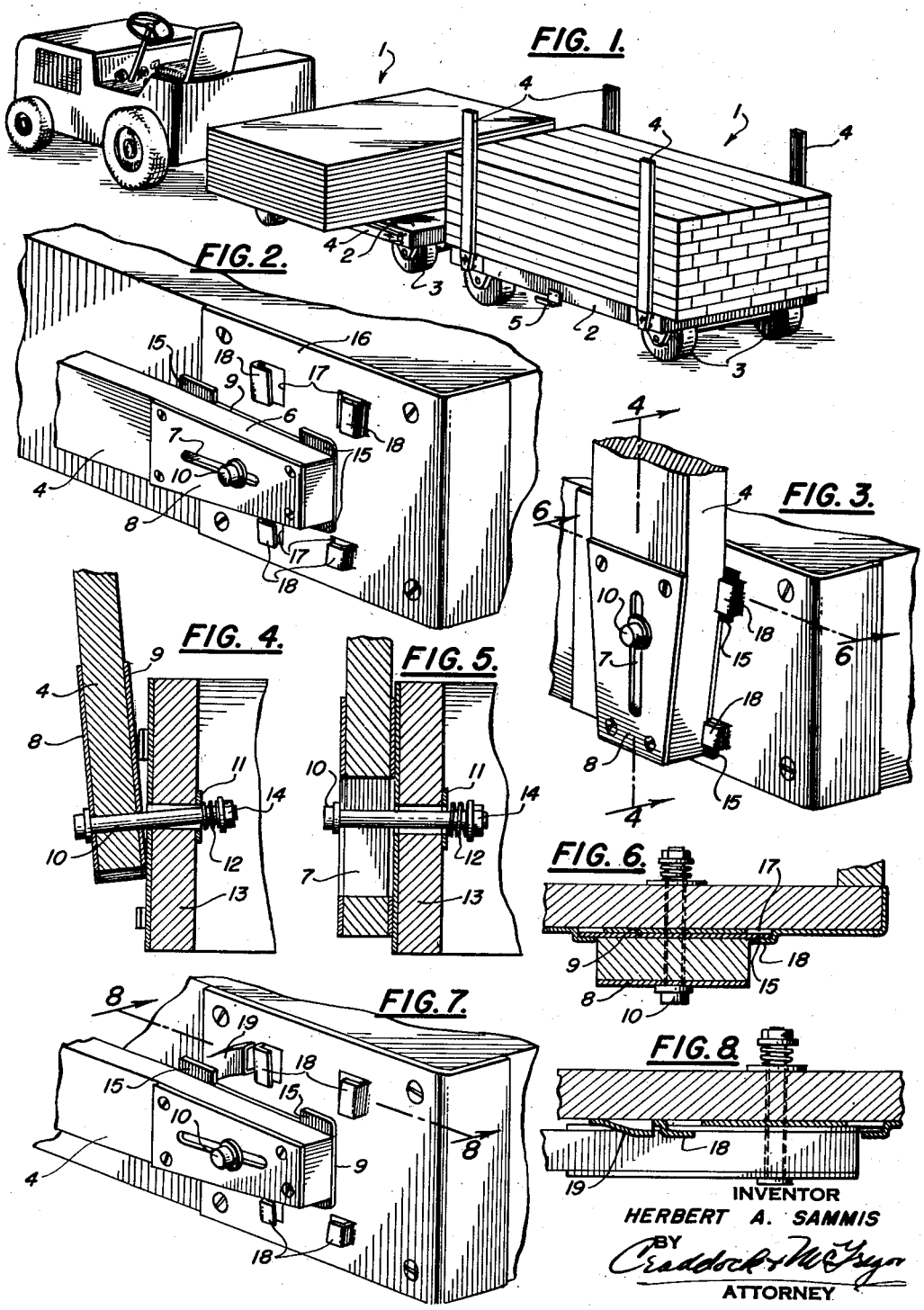
INVENTOR
HERBERT A. SAMMIS
ATTORNEY Patented July 7, 1953

2,644,715

UNITED STATES PATENT OFFICE 2,644,715

PIVOTED SIDE BARS FOR MILL WAGONS

Herbert A. Sammis, Huntington, N. Y.

Application December 28, 1949, Serial No. 135,505

5 Claims. (Cl. 296—43)

1

More particularly, my invention relates to a mill wagon in which the side bars thereof, which are adapted to embrace and permit stacking of a load therebetween, are irremovably secured to and so mounted on the sides of the wagon that they may be readily folded in collapsed position or, alternatively, securely positioned in upstanding relation to the bed of the wagon.

Heretofore, it has been the practice to provide the sides of the bed of the mill wagon with vertically extending tapered openings therein or brackets into which the base of a side bar is thrust, the bar being wedged therein and thereby retained in upstanding relation to the bed of the wagon. However, these openings are ordinarily of different sizes and shapes, mainly depending upon the manufacture or source of the wagon, and the bars are shaped to fit the particular brand of wagon. Hence, they do not properly fit other brands of wagons. Since the side bars for such wagons are often used in appreciable numbers and since they are removable from the wagons, confusion results. Whereupon in the rush of work, the mill hand will reshape the base of a side bar in order to adapt it to fit the particular opening in the wagon on which the side bar is to be employed. Obviously, this foreshortens the usable life of the side bar due to repeated confusion and re-shaping and, further, the rigid upstanding relationships between the side bar and the wagon bed will become lost, the side bars fitting loosely and thereupon failing to fulfill their intended function.

It is therefore a primary object of the present invention to provide a mill wagon in which the side bars are pivotally and slidably mounted on the sides of the wagon bed, means being provided whereby the side bars may be readily folded downwardly to lie adjacent the sides of the wagon bed while permitting ready positioning of the side bars in firm upstanding relationship to the wagon bed.

It is another object of this invention to provide a mill wagon of the foregoing character wherein laterally extending wings are secured to the side bars, which wings are generally tapering toward the base of the side bar and which are adapted slidably to fit within downwardly tapering grooves formed in a plate attached to the side of the wagon bed.

With the foregoing and still other objects in view, my invention includes the novel elements and the combinations and arrangements thereof described below and illustrated in the accompanying drawings in which:

2

Fig. 1 is a perspective view of two mill wagons of the present invention showing the side bars in upraised and overfolded positions, respectively;

Fig. 2 is a fragmentary perspective view showing preferred form of mounting for the side bars;

Fig. 3 is a fragmentary perspective view similar to Fig. 2 but showing the side bar in upraised position;

Fig. 4 is a fragmentary sectional view taken in about the plane 4—4 of Fig. 3;

Fig. 5 is a view generally similar to Fig. 4;

Fig. 6 is a fragmentary sectional plan view taken in about the plane 5—5 of Fig. 3;

Fig. 7 is a fragmentary perspective view of a modification; and

Fig. 8 is a fragmentary sectional plan view taken in about the plane 8—8 of Fig. 7.

As illustrated in Fig. 1, the mill wagon of my invention indicated generally at 1 comprises a platform type bed 2 which is substantially flat and adapted to support a load thereon. When the side bars are removed as in former type wagons, or, overfolded to lie alongside the bed of the wagon as in the present wagon; the bed may serve, like a dolly, to support flat sheets and the like which extend beyond the edges of the wagon bed. However, when the side bars are upraised, material such as lumber and the like may be stacked upon the bed and securely retained thereon between the side bars. These alternative arrangements are depicted by the two mill wagons shown in Fig. 1. Of course, suitable wheels 3 are mounted beneath the wagon bed for supporting the same.

In accordance with my invention, the side bars 4 are slidably and pivotally secured to the sides of the wagon bed. Also, means are provided for securing the side bars in substantially rigid upstanding relation with respect to the wagon bed. When the side bars are swung downwardly to lie adjacent the sides of the bed, a stop 5, one of which is secured on each side of the wagon bed, is provided to support the overfolded side bars.

Preferably, as shown in Fig. 2, the side bar 4 is tapered at the base thereof as in the zone indicated at 6. A longitudinally extending slot 7 is formed in the bar in the zone 6 which registers with slots in plates 8 and 9 which are secured on opposite sides of the bar. A bolt 10 (see also Figs. 4 and 5) serves to fasten the bar to the bed of the wagon, the shank of the bolt passing through the slot 7 and through an opening 11 in the bed of the wagon. A washer may be interposed between the head of the bolt and the plate 8 on the side bar, frictionally and slidably to engage the plate 8, while a spring 12 is preferably interposed between the side joist 13 of the frame of the wagon and the nut 14 on the end of the bolt. In this fashion, the side bar 4 may be pivoted relative to the bed of the wagon and also slid relative thereto along the longitudinal axis of the side bar.

For firmly securing the side bars in upstanding relation to the wagon bed, I also secure to the bars 4 a plate 9 which preferably lies between the bars and the bed of the wagon. The plate 9 is provided with outstanding wings 15 which extend laterally from both sides of the tapered end of the bar. Preferably, the lateral sides of the wings taper toward the base of the bar to fit within the correspondingly tapered grooves provided on the wagon sides as described in the following. A member adapted to cooperate with the wing portions of plate 9 is provided on the bed of the wagon preferably in the form of a plate 16, which is secured to the side of the wagon bed and is punched out as indicated at 17 to provide lips 18 which are bent outwardly from the plate 16 and thence reversely bent to lie in parallel relation thereto thereby forming grooves within which the wings 15 on the bars 4 are adapted slidably to engage. The lips 18 are preferably arranged as to form grooves which taper downwardly; the taper of the grooves of the lower pair of lips preferably being aligned with the taper of the grooves formed by the upper pair of lips.

As shown in Fig. 3, when the bar 4 is pivoted about the axis of bolt 10, it may be raised to an upstanding position with the upper pair of wings 15 of the bar above the grooves formed by the upper lips 18 and the lower pair of wings 15 lying above the lower pair of lips 18. The resilience of spring 12 permits the bar 4 to be swung or rocked outwardly from the side of the wagon bed so that the parts may be relatively moved to the above described positions. Upon releasing the outward pull on the side bar, it will move to a position flat against the side of the wagon bed as shown in Fig. 5 under the influence of spring 12 and the bar may then be longitudinally slid in a vertical direction to engage the wings 15 within the grooves formed by the lips 18 as shown in Fig. 3. In this fashion, the bars 4 may be firmly wedged in upstanding relation to the bed of the wagon.

Fig. 6 illustrates the wings of the side bar disposed within the grooves formed by the lips 18 of the plate 16 thereby serving securely to support the side bar on the bed of the wagon in upstanding relation thereto.

In Figs. 7 and 8, I have shown a modification of my invention wherein the side bar is formed in the manner hereinabove described and in which the plate 16, which is secured to the side of the wagon bed, is provided with a means for positively causing the side bar to rock or tilt outwardly at the upper end thereof when it is swung from a horizontal to a vertical position. It will be understood that in pivoting the side bars from a horizontal to a vertical position, the bar is slid axially relative to the bolt 10 so that the lower wings thereon pivot or swing in the space between the upper and lower pair of lips on the plates 16 while the upper pair of wings swing above the upper pair of lips. In this way, the wings will not strike the lips and prevent pivoting of the bar and the bar may be readily moved to an upstanding position. In the embodiment shown in Figs. 7 and 8, the plate 16 is provided with a cam surface 19 which is disposed adjacent one of the upper pair of lips as illustrated. Preferably, the cam surface is formed by a struck-up portion which is pressed outwardly from the plate 16. When the side bar is pivoted from a horizontal position, the plate 9 will engage the cam 19 and cause the bar to ride up and over the adjacent lip 18 whereby the bar may be readily moved to a vertical position from which it may be moved vertically and axially to engage the wings within the grooves formed by the lips.

In operation, the mill wagon of my invention may be readily adapted to support loads in the manners shown in Fig. 1, the side bars being firmly retained in upstanding position when so desired or readily over-folded to rest upon the stop 5 beneath the upper surface of the wagon bed. Not only may the wagon of my invention be quickly and easily converted from one form to the other, but also there is no danger of losing the side bars or having them maltreated, as in former wagons, to suit different conditions, thereby greatly reducing their useful life. With the present invention, the side bars are never lost or misplaced and they are always readily available and capable of quick erection to provide firm lateral supports for the wagon loads.

While I have described my invention in its preferred embodiments it is to be undertsood that the words which I have used are words of description rather than of limitation and that changes within the purview of the appended claims may be made without departing from the true scope and spirit of my invention in its broader aspects.

What is claimed is:

1. A mill wagon comprising a platform-type bed upon which a load is adapted to be supported, a plurality of slotted side bars for embracing said load therebetween, means including a plurality of bolts extending through said slots for pivotally and slidably connecting said bars to the side of said bed, each of said means including a lateral support plate secured to the side of said bed and having lip portions spaced therefrom and forming between them a downwardly mutually tapering groove, a tapered wing secured to and extending laterally from the sides of the bar and adapted to wedge in said tapering grooves when slid downwardly therein to maintain the bar in upstanding relation to the wagon bed, said bolts being spring loaded to permit said bars to swing past said lip portions to a position parallel with said plate means.

2. A mill wagon comprising a platform-type bed upon which a load is adapted to be supported, a plurality of slotted side bars for embracing said load therebetween, and means for pivotally and slidably connecting said bars to the side of said bed, each of said means including a bolt extending through one of said slotted bars, a lateral support plate secured to the side of said bed having two vertically spaced pairs of outwardly bent lips to form downwardly, mutually tapering grooves between the lips of each pair, the lips of each pair being laterally spaced sufficiently to accommodate a bar therebetween, and a plate secured to the bar having two pair of wing portions extending laterally from both sides of said bar, said wing portions being adapted to slide within the lips on the bed of the wagon whereby to wedge the bar in upstanding relation to the wagon bed.

3. A mill wagon comprising a platform-type bed upon which a load is adapted to be supported, a plurality of side bars for embracing said load therebetween, and means for pivotally and slidably connecting said bars to the side of said bed, each of said means comprising a longitudinally extending slot passing through the bar, a bolt engaging said bar and having its shank passing through said slot, said bolt being fastened to said bed, and resilient means for urging the bar toward said bed, a plate secured to the side of said bed having two vertically spaced pairs of outwardly bent lips to form downwardly, mutually tapering grooves between the lips of each pair, the lips of each pair being laterally spaced sufficiently to accommodate a bar therebetween, and a plate secured to the bar having two pair of wing portions extending laterally from both sides of said bar, said wing portions being adapted to slide within the lips on the bed of the wagon whereby to wedge the bar in upstanding relation to the wagon bed.

4. A mill wagon of the character recited in claim 1 in which the plate secured to the side of the wagon additionally includes a cam comprising an outwardly-pressed portion forming a bearing surface for said bar wings adjacent one of the groove-forming portions thereof whereby to prevent said bar from jamming in pivoting from a horizontal to a vertical position.

5. A freight vehicle comprising a platform-type bed upon which a load is adapted to be supported, a plurality of side bars for embracing said load therebetween, and means for pivotally and slidably connecting said bars to the side of said bed, each of said means comprising a longitudinally extending slot passing through the bar, a bolt engaging said bar and having its shank passing through said slot, said bolt being fastened to said bed, a plate secured to the side of said bed having two vertically spaced pairs of outwardly bent lips to form downwardly, mutually tapering grooves between the lips of each pair, the lips of each pair being laterally spaced sufficiently to accommodate a bar therebetween, and a plate secured to the bar having two pairs of wing portions extending laterally from both sides of said bar, said wing portions being adapted to slide within the lips on the bed of the wagon whereby to wedge the bar in upstanding relation to the wagon bed.

HERBERT A. SAMMIS.

References Cited in the file of this patent

UNITED STATES PATENTS

| Number | Name | Date |
|---|---|---|
| 79,315 | Clarke | June 30, 1868 |
| 489,895 | Critzer | Jan. 10, 1893 |
| 785,867 | Dodds | Mar. 28, 1905 |
| 865,448 | Stokoe | Sept. 10, 1907 |
| 1,203,622 | Huffman | Nov. 7, 1916 |